Aug. 5, 1969     S. W. BRIGGS ET AL     3,459,167
INTERNAL COMBUSTION ENGINE
Filed Jan. 22, 1968     2 Sheets-Sheet 1
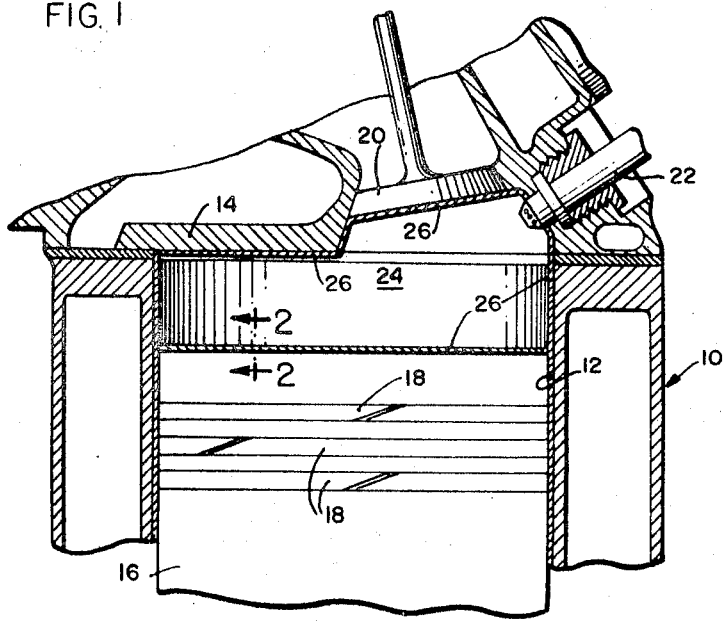
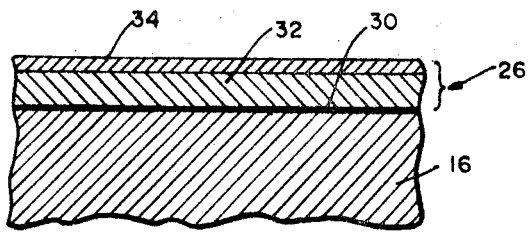
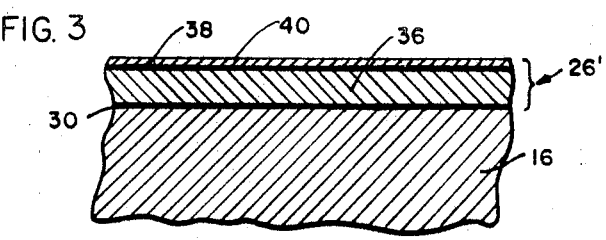
INVENTORS:
SOUTHWICK W. BRIGGS
HOWARD W. GILBERT
BY Mason, Kolehmainen, Rathburn & Wyss
ATT'YS

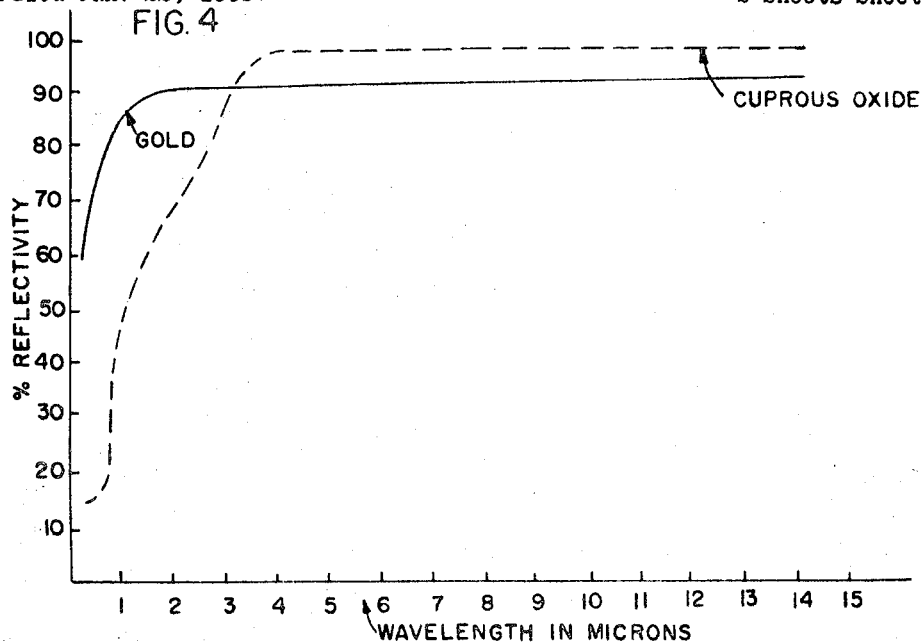
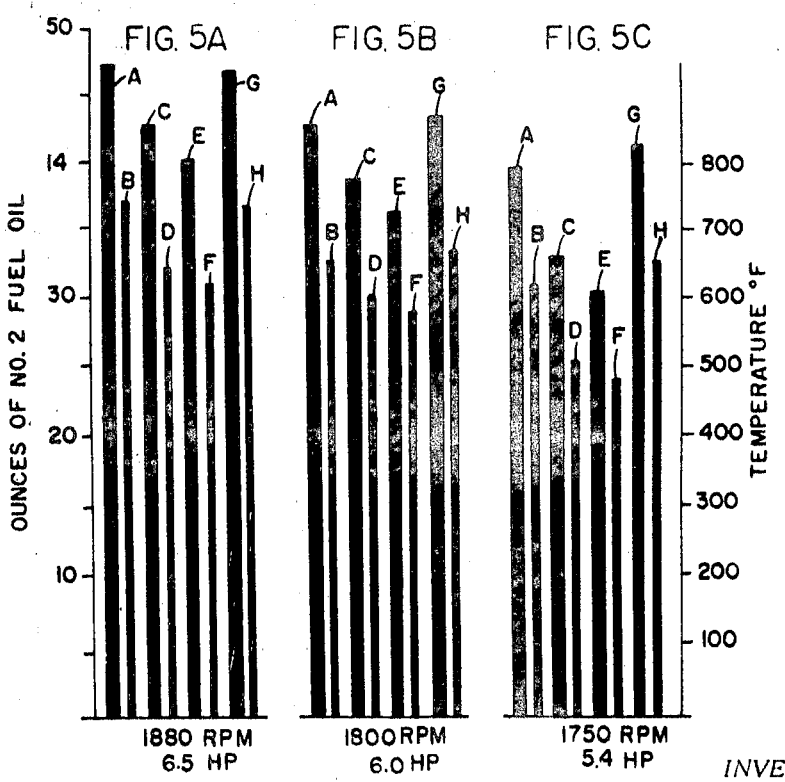

United States Patent Office 3,459,167
Patented Aug. 5, 1969

3,459,167
INTERNAL COMBUSTION ENGINE
Southwick W. Briggs, 6420 Western Ave., and Howard W. Gilbert, 6818 Brookville Road, both of Chevy Chase, Md. 20015
Continuation-in-part of abandoned application Ser. No. 673,732, Oct. 9, 1967, which is a continuation-in-part of abandoned application Ser. No. 511,690, Dec. 6, 1965. This application Jan. 22, 1968, Ser. No. 699,568
Int. Cl. F02b 77/02, 23/00
U.S. Cl. 123—191                                   12 Claims

ABSTRACT OF THE DISCLOSURE

An internal combustion engine having the walls defining the combustion chamber coated by materials which are highly reflective to infrared radiation, and also define a thermal barrier to greatly increase the efficiency of such engine. The coating material comprises cuprous oxides or gold preferably applied by spraying or electrodeposition on the surfaces of the combustion chamber.

---

The instant application is a continuation-in-part of a co-pending application of Southwick W. Briggs and Howard W. Gilbert, Ser. No. 673,732, filed Oct. 9, 1967 which in turn is a continuation-in-part of Briggs and Gilbert application, Ser. No. 511,690, filed Dec. 6, 1965, both now abandoned.

The present invention relates to internal combustion engines, particularly Diesel engines and is concerned with the use of combustion chamber surface materials and improved methods of applying such materials, which materials provide both high reflectivity throughout certain ranges of infrared wave lengths and a heat or thermal barrier whereby the walls of the internal combustion engine defining the combustion chamber remain relatively cool in the temperature changing atmosphere occurring therein, and which materials remain substantially unimpaired at the elevated temperatures encountered in the ordinary operation of such engines.

The application of various coatings to the surface of internal combustion engines forming their combustion chambers has been proposed in the past, but so far as is known, none of these prior proposals have achieved the results contemplated by the present invention. For example, in Hicks Patent 2,873,733, it has been suggested to utilize materials which reflect infrared radiation in order to reduce the inefficiency occurring by heat loss from the combustion chamber through radiation to the walls of such chamber. In an internal combustion engine, such, for example, as a Diesel engine, the combustion chamber is subjected to a temperature changing atmosphere which varies from ambient temperature to temperatures in excess of 3,000° F. Although the average temperature of such an internal combustion engine is often stated to be of the order of 1,800° F., the temperature of the atmosphere in the combustion chamber is at times much higher and at other times much lower.

It would be desirable to coat the combustion chamber surfaces with materials that assure lower temperatures of the walls immediately adjacent these surfaces such for example as the cylinder walls, piston head, exposed head portion, etc. This requires not only utilizing a highly reflective surface to infrared radiation, but also the provision of a heat barrier so that heat loss both by conduction and radiation in the temperature changing atmosphere is greatly reduced thereby to keep these parts, such for example as the piston, at a relatively low temperature. By providing a coating which is highly reflective to infrared radiation produced within the combustion chamber, such radiation is reflected back into the combustion zone of such chamber.

It would also be desirable that such coating provide a good thermal barrier to greatly reduce heat transfer to the walls covered by the coating whereby the temperature of the walls defining the combustion chamber will remain relatively cool, even though the temperature of the coating itself is relatively high to insure burning off of all carbon engaging such coating.

In addition, it would be desirable to provide an engine wherein the exhaust temperature and fuel consumption are substantially reduced, less heat is lost both in the exhaust and through the combustion chamber walls, a leaner fuel mixture for the same horse power is possible, the fine carbon particles normally found in the exhaust of Diesel engines is substantially eliminated, and the undesirable pungent odor of the exhaust is caused to disappear.

Accordingly it is an object of the present invention to provide an engine with the desirable characteristics enumerated above.

It is another object of the present invention to provide an engine with new and improved combustion chamber surface materials which provide high reflectivity throughout certain ranges of infrared wave lengths thereby to provide greatly improved efficiency of the engine.

Still another object of the present invention resides in the provision of an internal combustion engine having the combustion chamber surfaces provided with improved coating materials which not only greatly reduce heat loss by radiation in the infrared range but provide a good thermal barrier to heat losses by conduction or the like.

It is a further object of the present invention to provide an improved method of applying the aforesaid improved coating to the combustion chamber surfaces.

Further objects and advantages of the present invention will become apparent as the following description proceeds and the features of novelty which characterize the invention will be pointed out with particularity in the claims annexed to and forming a part of this specification.

For a better understanding of the present invention, reference may be had to the accompanying drawings in which:

FIG. 1 is a fragmentary sectional elevational view depicting the invention as applied to the combustion chamber of a Diesel-type engine;

FIG. 2 is a greatly enlarged fragmentary view taken on line 2—2 of FIG. 1 illustrating one embodiment of the present invention;

FIG. 3 is a view similar to FIG. 2 illustrating another embodiment of the present invention;

FIG. 4 is a diaphragm illustrating the reflectivity wave length characteristics of coating materials contemplated for the combustion chamber surfaces illustrated in FIGS. 2 and 3 of the drawings; and FIGS. 5A, 5B and 5C are bar graphs of actual test data which show the advantages obtained by virtue of the present invention.

Briefly the present invention is concerned with coating the combustion chamber surfaces, such for example as the piston head, the cylinder walls, the engine head, etc. of an internal combustion engine with a surface highly reflective to infrared radiation which coating also provides a thermal barrier. In one embodiment of the invention the combustion chamber walls are provided with a coating comprising a copper layer having an exposed surface of cuprous oxide. The cuprous oxide in the changing temperature atmosphere in the combustion chamber is both a thermal barrier and is highly reflective to infrared radiation. In another embodiment of the present invention, the coating comprises an exposed surface of gold, which is highly reflective to infrared radiation together with a thermal barrier of a ductile nickel beneath the gold.

In accordance with what is at present believed to be the preferred embodiment of applying the cuprous oxide coating to the combustion chamber surfaces, these surfaces are first cleaned. The surfaces are then subjected to a treatment analogous to sandblasting except that instead of sand, aluminum oxide particles are used. This produces a surface which insures a mechanical lock with the coating subsequently applied. The cuprous oxide coating is then applied by flame spraying copper particles which are small enough to pass through a 300 mesh screen.

In accordance with the present invention, there is provided a combustion chamber substantially defined by surfaces formed of a material at least 75% reflective to wavelengths between 0.7 and 10.0 microns at combustion chamber surface temperatures exceeding 500° F. It is preferred that the material be more than 75% reflective to wavelengths between 2.0 and 10.0 microns at combustion chamber surface temperatures exceeding 900° F. Moreover, the materials should preferably withstand operating temperatures of the combustion chamber surfaces as high as 1,800° F.

Materials conforming to these requirements include coatings of cuprous oxide and gold. Where gold is used the coating must include a thermal barrier such as nickel or the like. Of these coatings the cuprous oxide is preferred primarily because of cost. The coatings not only provide the high reflectivity for infrared radiation but also provide the desired thermal barrier to greatly increase engine efficiency. Because of the range of wavelengths to which the coatings are required to be highly reflective, unpolished or matte finishes on such materials are desirable and polished surfaces are actually undesirable.

Referring now to the drawings and specifically to FIG. 1, the present invention is by way of example illustrated as being applied to a Diesel engine, although obviously it has other applications. In FIG. 1 the engine block is designated by the reference numeral 10. Defined in the block is a cylinder 12 closed by a head 14. Reciprocably mounted within the cylinder 12 is a piston 16 provided with piston rings 18. The head 14 is illustrated as being provided with valves such as 20 and fuel nozzles such as 22, both of which are conventional in this art. A combustion chamber 24 is defined within the cylinder 12 above the piston 16.

In accordance with the present invention, the major surfaces defining the combustion chamber 24 are coated with materials generally designated at 26 which will be described in greater detail hereinafter with reference to other figures of the drawings. These materials will not only withstand the operating temperatures encountered but will resist corrosion. Additionally they will provide a thermal barrier between the surface of the coating and the piston, cylinder walls, head, etc., so that the surface of the coating exposed to the combustion chamber may remain at a substantially higher temperature than the walls to which it adheres whereby carbon particles engaging the surface are burned off thus insuring much more complete combustion. Additionally, these surfaces of the present invention will provide at least 75% reflectivity to infrared wavelengths between 0.7 and 10.0 microns whereby the infrared radiation is reflected into the combustion zone where it can be used to maximum efficiency.

It is known that 50% to 80% of the heat reaching the walls of a combustion chamber is by infrared radiation and the rest of it is primarily by thermal conduction and convection. By using the coatings of the present invention greatly increased efficiency results, because the possible heat loss is greatly reduced. In a device built in accordance with the present invention, it was found that by using the coatings of the present invention exhaust temperatures were reduced from 750° F. to 650° F. Substantially less fuel was burned, obviously less heat was wasted, lower head temperatures were obtained and not only was the fine carbon usually found in the exhausts of Diesel engines essentially eliminated and the pungent odor of the exhaust reduced to a very faint odor, but greater horsepower with a leaner mixture was obtained. In FIG. 1 of the drawings it is indicated that the coating materials 26 may be applied to the head of the piston 16, the walls of the cylinder 12, the head of the valve 20, the head 14 and it can also be applied to the fuel nozzle 22 and to other surfaces that might be exposed to combustion.

Referring now to FIG. 2 of the drawings there is disclosed a greatly enlarged fragmentary view illustrating a section through a coating comprising one embodiment of the present invention and showing a portion of the head of the piston 16 in section. The entire coating is designated by the reference number 26. It should be understood that the thicknesses of the various portions of the coating 26 are not illustrated to scale, but the drawing is somewhat schematic better to illustrate the present invention. It will be understood that the piston may be formed of any suitable material, the common ones being aluminum and cast iron. Whether the piston is aluminum or cast iron the first step in some embodiments of our invention is to provide a flash so that copper can be bonded thereto. In the case of an aluminum piston 16, there is preferably provided a chemical zinc plating flash designated as 30. In the case of a cast iron piston this would comprise a copper flash. In either case this flash 30 would comprise a very thin coating of the order of a millionth of an inch in thickness. Applied to the flash 30, in accordance with the present invention is a layer of copper designated as 32. Copper may be put on in any suitable way, one suitable way being by electroplating although flame spray application is believed to be the preferred embodiment. Plasma plating may also be used. A more detailed description of flame spray application is included hereinafter. Satisfactory operation has been obtained by using a layer of copper having a thickness of the order of one and one-half thousandths of an inch, but in order to avoid hot spots it is preferred to provide a copper layer 32 having a thickness of between six to ten thousandths of an inch.

If the plating method of applying the copper is employed, then in accordance with the present invention, the outer portion of the copper layer 32 in the combustion chamber is converted to cuprous oxide. One method of accomplishing this is to use an oxyacetylene torch and expose the copper layer 32 to the oxidizing portion of the torch at a temperature of 1,170° F. or higher which results in a cuprous oxide layer generally designated at 34 having a thickness between one thousandth and two thousandths of an inch. It has been found essential that the cuprous oxide surface 34 be obtained before it is subjected to use in a combustion chamber. This is because when a copper surface is subjected to the combustion chamber gases without the cuprous oxide coating first being associated therewith the oxygen in the copper reacts with the reducing gases to cause exfoliation. In other words the copper just peels off. This is completely eliminated with the present arrangement.

The particular coating 26, comprising layers 30, 32 and 34 heretofore described, has proved to be very satisfactory. It is an economical coating and is highly reflective to infrared wavelengths between 0.7 and 10.0 microns, in fact being at least 75% reflective and in general substantially higher. In addition, the cuprous oxide layer has a low thermal conductivity and therefore provides a thermal barrier to permit the piston head or the other wall defining the combustion chamber to remain at a relatively cool temperature. This is because the constantly changing atmosphere in the combustion chamber from a very high temperature when combustion takes place to a very low and in fact ambient temperature when the cylinder is scavenged permits this thermal barrier to function to keep the walls covered by the coating relatively cool.

In what is presently believed to be the preferred method of applying the cuprous oxide coating, i.e. a flame spraying operation, the surfaces to be coated are roughened to insure a good mechanical lock with the coating. By means of sand blasting equipment, but instead of sand using particles of aluminum oxide, a roughened surface is obtained. However, before proceeding with the roughening operation it is essential that the surfaces are clean of all oil and the like. Chemical cleaners with or without the use of supersonic vibrations are employed for this cleaning operation. When the surfaces to be coated are roughened they are raised in temperature so as to be close to the melting point. Then copper powder which will pass through a 300 mesh screen is applied through a conventional flame spraying gun in the open atmosphere to provide a uniform coating at least six to seven thousandths of an inch in thickness. The flame spraying in open atmosphere insures that a cuprous oxide surface is obtained. These surfaces with the proper equipment can be coated in a matter of seconds.

The necessary equipment to accomplish the above described preferred coating process is substantially less costly than that required for other methods of applying the coating.

In tests on three identical air cooled six horsepower Diesel engines wherein engine A had the combustion surfaces coated by the flame spray process described above, engine B had the combustion surfaces uncoated and engine C had a cuprous oxide coating applied by electroplating as described above, the following results were obtained with all factors such as output load, compression, ambient temperature, oil consumption etc., all equalized.

| Engine | Ounces of fuel consumed | Head temperature (° F.) | Oil temperature (° F.) |
|---|---|---|---|
| A | 38½ | 285 | 170 |
| B | 48½ | 340 | 198 |
| C | 41½ | 300 | 182 |

It is obvious from the above that greatly increased efficiency is obtained with the cuprous oxide coating and that a substantial increase is obtained using the improved coating process of the present invention.

Referring now to FIG. 3 of the drawings, there is illustrated a modification of the present invention. The piston 16 is again illustrated in part and the coating of the present invention is generally designated at 26'. As in FIG. 2 if the piston is made of aluminum the coating 26' includes a chemical zinc plating flash designated as 30 which as has been mentioned above has a thickness of the order of one millionth of an inch. If a cast iron piston is employed then this flash is preferably a copper flash. In accordance with the present invention, superimposed on the flash 30 is a thermal barrier comprising a layer 36 of pure ductile nickel, preferably between three to seven thousandths of an inch in thickness. This nickel layer provides a heat or thermal barrier due to its relatively low thermal conductivity. It has been found that if the thickness of the ductile nickel layer is below three thousandths of an inch, it is not sufficiently thick to function as a good heat barrier whereas if its thickness is in excess of seven thousandths of an inch the additional thickness does not provide enough additional decrease in thermal conductivity to be justified.

In accordance with the present invention, the outer surface of the coating 26' is a gold layer designated as 40 having a thickness of between two to three ten thousandths of an inch. In order, however, that the gold layer 40 will not diffuse into the nickel, there is interposed between the layers 36 and 40 a very thin palladium or platinum flash defining a diffusion barrier designated as 38, preferably of the order of a millionth of an inch in thickness. Gold has a very high reflectivity to infrared radiation relative to certain other materials particularly below wavelengths of the order of three microns. However, if a gold layer, such as 40, is employed without the thermal barrier 36, it will never get hot enough to burn off the products of combustion which it will be subjected to in a combustion chamber. It is very essential that the outer layer be hot enough to accomplish such burning off while the wall portions underneath remain cool. Preferably plasma plating is used to apply the gold and nickel layers of the coating 26'.

In FIG. 4 of the drawings, there are illustrated the reflectivity-wavelength characteristics of the two materials described above and illustrated specifically in FIGS. 2 and 3 of the drawings.

In FIG. 5 of the drawings, there is illustrated in bar graph form actual test data relative to the present invention wherein the fuel consumption for the same horsepower is shown as is also the exhaust temperature. In running these tests a Diesel engine was employed, and so that the same engine was used for every test, the pistons and cylinder heads were changed. One set of parts defining the combustion chamber had no coating. A second set had the coating of FIG. 2 and a third set had the coating of FIG. 3. The first graph A shows the ounces of fuel oil consumed when uncoated combustion chamber walls are involved. The exhaust temperature is represented by the bar graph B. The parts were then replaced by those having the coating 26' of FIG. 3 of the drawings. The ounces of fuel oil consumed with these parts is represented by bar graph C. The exhaust temperature with the coating of FIG. 3 is represented by bar graph D. Then the parts were replaced by those with the coating of FIG. 2 of the drawings and the ounces of fuel oil consumed is represented by the bar graph E and the corresponding exhaust temperature by the bar graph F. Immediately following the last referred to test, the original uncoated parts were replaced and the test rerun to see if any changes had occurred. The bar graph G shows the ounces of fuel consumed with the uncoated parts and the bar graph H represents the corresponding exhaust temperature. It is obvious from these bar graphs that greatly increased efficiency and reduced exhaust temperatures are obtained by employing the present invention.

FIGS. 5B and 5C are bar graphs showing identical tests as described in connection with FIG. 5A but with lower r.p.m. and lower horsepower output for each test.

From the above description it will be apparent there has been as indicated on the graphs provided an internal combustion engine having the combustion chamber defined by surfaces formed by coatings of the present invention which reduce the exhaust temperature, reduce the fuel consumption reduce the heat loss, eliminate the fine carbon discharge from the exhaust and substantially reduce the pungent odor of the exhaust gases.

While there have been shown and described several embodiments of the present invention, it will be apparent to those skilled in the art that various changes and modifications may be made without departing from the invention in its broader aspects, and it is therefore contemplated in the appended claims to cover all such changes and modifications as fall within the true spirit and scope of the invention.

What is claimed as new and desired to be secured by Letters Patent of the United States is:

1. An internal combustion engine having a combustion chamber substantially defined by walls having applied thereto a coating which provides a thermal barrier against conductive heat transfer and an outer surface highly reflective to infrared radiation.

2. An internal combustion engine having a combustion chamber substantially defined by walls having applied thereto a coating having a surface at least 75% reflective to wavelengths between 0.7 and 10.0 microns at combustion chamber surface temperatures exceeding 500° F., said coating also providing a good thermal barrier in the temperature changing atmospheres of said combustion chamber.

3. A positive displacement internal combustion engine having a combustion chamber defined by surfaces at least one of which is formed by cuprous oxide formed in air or oxygen in excess of 1100° F. prior to operation of the engine and being at least 75% reflective to wavelengths between 0.7 and 10.0 microns at combustion chamber surface temperatures exceeding 500° F.

4. An internal combustion engine having a combustion chamber defined at least in part by a coating comprising a surface of gold and a thermal barrier beneath the gold comprising ductile nickel.

5. The internal combustion engine of claim 1 wherein said coating includes a metallic oxide.

6. The internal combustion engine of claim 1 wherein said coating includes a metal.

7. The internal combustion engine of claim 1 wherein said coating comprises a layer of copper and a surface of cuprous oxide.

8. The internal combustion engine of claim 1 wherein the surface of said coating is more than 75% reflective to wavelengths between 2.0 and 10.0 microns at combustion chamber surface temperatures exceeding 900° F.

9. The internal combustion engine of claim 1 wherein the surface of said coating is at least 75% reflective to wavelengths between 0.7 and 10.0 microns at combustion chamber surface temperatures as high as 1,800° F.

10. The internal combustion engine of claim 1 wherein the surface of said coating has a matte finish.

11. The method of coating the combustion surface of an internal combustion engine with a cuprous oxide layer which comprises, cleaning said surface, subjecting said surface to a bombardment of hard particles to roughen said surfaces, and then by means of a flame spray operation applying a coating of the order of six to seven thousandths of an inch in thickness to said surface.

12. The method of coating the combustion surfaces of an internal combustion engine with a cuprous oxide layer which comprises, chemically cleaning the surfaces to be coated, subjecting said surfaces to a bombardment of particles of aluminum oxide to roughen said surfaces, and then by means of a flame spray operation applying a coating of the order of six to seven thousandths of an inch in thickness to said surfaces, using copper powder which will pass through a 300 mesh screen.

References Cited
UNITED STATES PATENTS

| | | | |
|---|---|---|---|
| 1,975,818 | 10/1934 | Work | 92—223 |
| 2,707,691 | 5/1955 | Wheildon | 117—105.2 |
| 2,873,733 | 2/1959 | Hicks. | |
| 2,914,048 | 11/1959 | Philip. | |
| 2,926,649 | 3/1960 | Hicks. | |
| 2,978,360 | 4/1961 | Bradstreet et al. | 92—223 |
| 3,203,321 | 8/1965 | Rosen | 92—223 |
| 3,293,064 | 12/1966 | Aves | 117—105.2 XR |
| 3,332,752 | 7/1967 | Batchelor et al. | 117—105.2 XR |

WENDELL E. BURNS, Primary Examiner

U.S. Cl. X.R.

92—223; 117—105